_United States Patent Office_

3,549,726
Patented Dec. 22, 1970

1

3,549,726
PREVENTING ACCUMULATION OF MACROGEL
PARTICLES IN RUBBER-MODIFIED POLYMERS
Walter F. Hanzl, Pompton Plains, N.J., assignor to Dart
 Industries Inc., Los Angeles, Calif., a corporation of
 Delaware
No Drawing. Filed May 1, 1967, Ser. No. 634,827
Int. Cl. C08d 9/08; C08f 1/02, 15/04
U.S. Cl. 260—880                                    11 Claims

ABSTRACT OF THE DISCLOSURE

Undesirable macrogels are prevented from accumulating in rubber-modified polystyrene, ABS and the like, if most of the inner surface of a polymerization reactor's vapor section is maintained at least 35° C. cooler than the polymerization temperature.

BACKGROUND OF THE INVENTION

(1) Field of the invention

This invention relates to an improved process for preparing rubber-modified polymers in which undesirable macrogel particles are prevented from forming and from building up in the resulting polymers.

(2) Description of prior art

In the preparation of rubber-modified polymers by bulk or modified bulk polymerization processes, undesirable macrogel particles have been found to accumulate in the products. These macrogels comprise non-homogeneous, cross-linked, amorphous resins which do not blend with the rubber-modified polymer product. The macrogels are insoluble in all types of solvents and appear as opaque spots in films and other shaped products of the rubber-modified polymer. These undesirable macrogels have been found, for example, in the finished products from bulk-suspension polymerization processes in which acrylonitrile, butadiene rubber and styrene are converted to ABS polymers.

Elaborate modifications have been made to the various thermo-forming processes such as extrusions and injection molding in an attempt to reduce the problem caused by these macrogels in the finished product. Prior art methods are available, for example, which filter out the macrogel particles or force the macrogel-containing polymers through beds of microporous materials to reduce the size of the macrogels below detectable levels (see U.S. Pat. 3,197,533). However, none of these methods solves the basic problem of preventing the formation of the macrogels as does the process of the present invention. An additional problem with these prior art methods is that the opaque, amorphous rubbery macrogels tend to squeeze through the filter screens and microporous beds and ultimately show up in the finished product.

SUMMARY

The object of this invention is to provide an improvement in a bulk polymerization process by preventing the formation of undesirable macrogel particles during the bulk prepolymerization step.

The present invention provides in a process for preparing a rubber-modified polymer in which a monomer from the group consisting of monovinyl aromatic, monomeric vinyl, monomeric vinylidene, or mixtures thereof is polymerized with a rubbery material at an elevated temperature in a confined reaction zone, the improvement which comprises maintaining an inner surface of a vapor section of the reaction zone at least 35° C. cooler than the elevated temperature. The inner surface of this vapor section is exposed to a non-homogeneous mixture of the reactants during the polymerization step and provides centers for rapid formation of the insoluble macrogel particles or granules. Under the prior art conditions in the vapor section, the macrogel particles rapidly grow in size from less than 35 microns to as much as 1 centimeter or more at their largest dimension. The individual particles agglomerate to completely cover the inner surface of the vapor section with a porous mass of particles 5 to 15 centimeters thick. The insoluble particles eventually break off from this mass on the inner surface causing macrogel contamination of the resulting polymer product. By maintaining the inner surface at least 35° C. cooler than the temperature at which the polymerization step is carried out, the undesirable macrogel particles are prevented from forming on the inner surface and the reaction product recovered from the confined reaction zone is substantially free of the particles.

THE PREFERRED EMBODIMENTS OF THIS INVENTION

The vinyl monomers used in the process of this invention include monovinyl aromatic compounds having the vinyl group attached directly to the carbon atom of the aromatic nucleus. Styrene is one of the preferred monovinyl aromatic compounds used in this process. Examples of other compounds which can be used are the alkyl and/or halogen derivatives of styrene including the methylstyrenes, ethylstyrenes, isopropylstyrenes, butylstyrenes, including both the mono- and higher substituted alkyl forms, the cloro- and dichlorostyrenes, as well as the mono- and dibromostyrenes, or mixtures of these compounds with styrene or with each other. The monomeric vinyl and vinylidene compounds which can be used include acrylonitrile, methacrylonitrile, methylacrylate, methyl methacrylate, methacrylic acid, acrylic acid, vinyl chloride and mixtures thereof. It is desirable to combine a monomeric vinyl or vinylidene compound with one or more of the monovinyl aromatic compounds to obtain a product with enhanced properties.

The rubbery materials used in this process include natural rubber, or synthetic rubbers, such as SBR-type rubbers, which are copolymers of styrene and butadiene having 60 to 95% by weight of butadiene and from 40 to 5% by weight of styrene; solution-polymerized linear random or block copolymer type SBR's wherein stereospecific catalysts are used and wherein the amount of butadiene can vary from 60 to 95% by weight of the monomeric mixture and in the more preferred embodiment, from about 70 to 95 weight percent; synthetic nitrile type rubbers containing from 55 to 82% by weight of butadiene and from 45 to 18% by weight of acrylonitrile; rubbery homopolymers of butadiene and of isoprene; the rubbery copolymers of isobutylene combined with butadiene or isoprene; and rubbery terpolymers of ethylene, propylene, and a minor amount of a diene monomer such as cyclopentadiene. The preferred rubbery material is a linear polybutadiene having a cis (polymerized by 1,4 addition) content of about 30 to 98 weight percent, preferably 35 to 60 weight percent. Preferably a minor amount of the rubbery material is dissolved in the polymerizable monomer and polymerized in bulk in the confined reaction zone to form the rubber-modified polymer.

Butadiene (or isoprene) polymerized by cis-1,4 form exists in a rubbery form at ambient temperatures. The cis-1,4 form can be produced either by lithium metal or lithium alkyls or by a Ziegler type catalyst system, as is well known in the art. These methods of polymerization yield linear polymers in contradistinction to a largely non-linear polymer obtained by well known emulsion polymerization recipes. The preferred cis-polybutadiene which can be employed in the compositions of this invention will have a viscosity between 20 to 60 as measured on a Mooney viscometer at 100° C. (ML$_4$) (ASTM-D-927-55T).

The rubbery materials used in this process usually have molecular weight of at least 15,000. They can be incorporated into the reaction mixture in amounts from about 2 to 30% based on the total weight of the reaction mixture, and more preferably the rubbery components are used in amounts of about 4 to 15 weight percent. In the preparation of ABS polymers, about 3 to 10% of the rubbery component results in a medium to high impact ABS polymer, and about 10 to 15% rubber yields very high impact resins.

Antioxidants, chain regulators, lubricants and inert fillers can also be added to the reaction mixture comprising the monomers and rubbery material. Examples of suitable antioxidants include trisnonyphenyl phosphite and phenolic type materials such as 2,6-di-t-butyl-4-methyl-phenol which are added in amounts from about 0.2 to 2% by weight of the total reaction mixture and preferably in amounts of from about 0.3 to 1 weight percent. Mercaptans such as nonyl, decyl and dodecyl mercaptans and other alkyl mercaptans having from 6 to 24 carbon atoms per molecule, or mixtures of these, can be added to the reaction mixture in amounts from about 0.01 up to a maximum of 2 weight percent for controlling polymer chain length. The preferred concentration of mercaptans is from about 0.02 to 0.4 weight percent depending on the melt flow properties desired. Lubricants which can be incorporated in the reaction mixture include polybutenes, hydrogenated polybutenes, phthalates, paraffin wax or mineral oil in amounts up to about 5 weight percent, and preferably in amounts of about 0.5 to 3.0 weight percent, for improving the processing and tensile elongation characteristics of the polymers.

The bulk polymerization step can be carried out with or without initiators. The initiator(s) is present in small amounts, i.e., about 0.02 to 0.5, up to a maximum of 1.0% based on the total weight of the reaction mixture. The initiator is of a free-radical generating type compound such as an organic peroxide compound. Suitable peroxide initiators include dibenzoyl peroxide, dilauroyl peroxide, di-t-butyl peroxide, cyclohexanone peroxide, t-butyl perbenzoate, t-butyl hydroperoxide, diacetyl peroxide, diethyl peroxydicarbonate, cumene hydroperoxide and dicumyl peroxide.

In one of the preferred embodiments of this invention, an ABS polymer is prepared by a bulk prepolymerization step followed by a suspension polymerization step. A confined prepolymerization zone is provided with means for agitation and with a jacket through which hot oil or other suitable media circulates for heating the reactants to and maintaining them at prepolymerization temperatures. Positioned above the liquid level of the reactants is the vapor section of the prepolymerizer. The outer surface of the vapor section is provided with cooling coils through which cold water circulates, or with other suitable means for maintaining the inner surface of the vapor section at a temperature in the range of 35° to about 50° C. cooler than the prepolymerization temperature during the prepolymerization step.

A monomeric mixture of acrylonitrile and styrene is added to the prepolymerization zone in a ratio to about 20 to 40 parts by weight of acrylonitrile to 80 to 60 parts by weight of styrene. The concentration of the vapors of the monomeric mixture in the vapor section is lowered by adding an inert gas, i.e., nitrogen, helium and argon, in an amount of at least about 10% based on the weight of the monomeric vapors. This minimizes the tendency of the monomeric vapors to reflux off the cool inner surface of the vapor section and suppresses the vaporization of the monomeric mixture. Finely ground monomer-soluble diene rubber in an amount from about 4 to 15 weight percent is dissolved in the monomeric mixture. Antioxidants, lubricants and inert fillers are added to the mixture if desired. The mercaptan chain regulator is then added to the reaction mixture and the bulk prepolymerization step is commenced either thermally or using a peroxide initiator of the oil soluble type.

In the case of thermal initiation, the temperature range can be from 90° to 120° C., preferably 100° to 110° C.; and in the case of the peroxide initiation, the temperature can range from about 60° to 120° C.; preferably from about 75° to 90° C. The pressure range can be from 20 to 70 p.s.i.a., preferably from about 30 to 60 p.s.i.a. The prepolymerization is continued until from about 15 to 50% of the monomers are polymerized in the reaction mixture. The prepolymerization step generally takes from about 3 to 6 hours. If included in the reaction mixture, the peroxide catalyst is preferably used in amounts from about 0.01 to 0.15% based on the total mixture in the reaction zone.

During the bulk prepolymerization step, the components of the system are thoroughly agitated. Agitation is required to properly disperse the rubbery material as it precipitates out of solution during the prepolymerization step.

After prepolymerizing to the desired conversion level, the reaction product mixture is removed from the confined prepolymerization zone and suspended in an aqueous system containing suspension stabilizers in a suspension zone. Peroxide initiators are used in the suspension polymerization step to substantially complete the polymerization. A single initiator can be added to the prepolymerization step as indicated above and a second initiator can be added to the suspension step. However, it is possible to add two initiators to the prepolymerization step, such as a low temperature initiator for prepolymerization and a high temperature initiator for the subsequent suspension step. A suitable initiator which can be used during suspension polymerization is an organic peroxide such as dibenzoyl peroxide, dicaproyl peroxide, dilauroyl peroxide, t-butyl perbenzoate, di-t-butyl peroxide or mixtures thereof. The suspension polymerization initiator is usually required to shorten the overall time of the polymerization. The amounts of suspension step initiator used are based on the weight of the total prepolymer reaction mixture. They range from about 0.05 to 0.3 weight percent when a particular peroxide is used alone and from about 0.05 to 0.4 weight percent for each of the initiators when a combination of peroxides is used for the polymerization steps. The preferred catalyst levels are from about 0.1 to 0.2 weight percent for a single catalyst and 0.075 to 0.15 weight percent for each when the combination is used. Polymerization of the prepolymer suspended in the aqueous media containing the suspension stabilizer is continued at a given time-temperature cycle until the remaining monomer in the prepolymer is substantially completely polymerized into uniform sized beads.

Suitable suspension stabilizers include carboxymethyl cellulose, polyvinyl alcohol, methyl cellulose, sulfonated polystyrenes, polyglycol ethers and the like. The preferred suspension stabilizer is a water soluble non-ionic colloid of a high viscosity in an aqueous solution such as hydroxyethyl cellulose. The use of this stabilizer results in non-agglomeration of the polymer beads, minimum water of occlusion of the beads and a narrow size distribution for the beads. Hydroxyethyl cellulose having a viscosity in a 1% aqueous solution at 25° C. of from 750–10,000 cps. (Brookfield viscometer) is adequate. However, a more preferred viscosity range for the 1% aqueous solution is from 1500–3500 cps. (Brookfield viscometer) at 25° C. The preferred hydroxyethyl cellulose is commercially available. Information on properties of hydroxyethyl cellulose can be found in Brownell, H.H. et al., Canadian Journal of Chemistry 35, 677 (1957) and Cohan, S.G. et al. Journal American Chemical Society 73, 3954 (1950).

In preparing the aqueous suspension, the hydroxyethyl cellulose is slowly sifted into the water and rapidly stirred to avoid the formation of agglomerates. If desired, a surface active agent such as sodium dodecylbenzene sulfonate can also be included in the suspension water in an amount of from about 0.001 to 0.01% based on the weight of the water. The amount of hydroxyethyl cellulose used is from about 0.025 to 1.5 weight percent and preferably from about 0.075 to 1.0% based on the weight of water. Any dissolved oxygen or oxygen in the atmosphere immediately above the suspension is displaced by the use of nitrogen.

The prepolymer is added to the suspension, preferably in the vicinity of the agitator blades so as to facilitate the formation and dispersion of polymer beads. The prepolymer is added in an amount such that the prepolymer to water ratio is from about 1:2 to 5:4, with the best results being obtained with a ratio of 3.4 to 1:1.

The temperature of the suspension is generally increased from, for example, room temperature or higher such as 90° C. up to about 135° C. and can, under suitable conditions, be increased up to 150° C. After a given period, non-agglomerated, uniform sized, high impact, thermoplastic polymer beads of uniform color are formed in suspension. The time-temperature cycle best suited for the completion of the polymerization and suspension after the bulk prepolymer has been transferred to the suspension system is generally 4 to 10 hours at temperatures in the range from about 60° to 145° C. Excellent results are obtained, for example, with t-butyl perbenzoate if the suspension is maintained at a temperature of from 100° to 115° C. for 2 to 4 hours, then from 115° to 125° C. for 1 to 2 hours and finally from 125° to 145° C. for 1 to 2 hours.

The substantially completely polymerized beads prepared in accordance with the above particular embodiment are separated from the suspension water by any of the conventional methods, such as screening, sedimentation or centrifuging and then the beads are washed, dried, extruded, pelletized and packaged.

In another embodiment of this invention a modified bulk prepolymerization step can be used in place of the bulk prepolymerization step described above. In this step a suitable diluent is added to the prepolymerization zone along with the monomers. Diluent polymerization has many advantages over bulk polymerization. For example, reaction temperatures, heat transfer and reaction rates are easier to control for the diluent polymerization over that of bulk polymerization. The particular diluent used depends on the particular monomer to be polymerized. An alkyl aromatic diluent having preferably one alkyl group containing two carbon atoms or more which is liquid at ambient temperatures is a very desirable diluent for the foregoing embodiment. The preferred diluent when the monomer is styrene, has a boiling point greater than 110° C. and preferably in the range of 130° to 200° C., i.e., diethylbenzene, methylethylbenzene with ethylbenzene being especially preferred. The amount of diluent used in the diluent prepolymerization step can range from 3 to 30% based on the weight of the reaction mixture. Preferably not less than about 5%, in the case of low rubber content formulations, e.g., medium impact polymers and not more than about 25 weight percent in the case of high rubber content formulations, e.g., high impact ABS polymers. If more than about 30 weight percent diluent is used, there is little additional improvement in the process. Higher concentrations of diluent, i.e., about 30% have been used. However, the capacity of the processing equipment is a factor that must be considered when one goes to higher levels of diluent. The temperatures used during the diluent prepolymerization step usually range from 60° to 140° C. for the reactions contemplated by the foregoing embodiment. Temperatures of at least 60° C. are used in the case of peroxide initiated reactions and at least 100° C. in the case of thermal initiated reactions.

In solution polymerization, one must include the additional step of devolatilization to remove the solvent from the product mixture. For example, the completed polymer-diluent mixture should be transferred to a system comprising a heat exchanger and a devolatilizer where the mixture is heated in either a batch or continuous manner. The volatilizer is operated at temperatures in a range of about 200° to 240° C. and reduced pressures, i.e., about 5 to 360 mm. Hg. These conditions will volatilize the diluent, unreacted monomers and other volatile materials which would be detrimental to the finished product. The vapors are collected in a separate system and can be subsequently separated for further use. The devolatilized polymer can be pumped directly to a die housing or melt fed into an extruder or other apparatus for converting the melt to a suitable form.

EXAMPLE

This example when compared with the control shows the advantages of the process of the present invention in which the inner surface of the vapor section was maintained at least 35° C. cooler than the prepolymerization temperature. The following procedure was used in this example: Linear polybutadiene having a cis-1,4 configuration of about 35% and having a Mooney viscosity number of 35 ML$_4$ (100° C.) was chopped into small granular pieces and added to a monomer blend of styrene and acrylonitrile in a dissolving vessel. Mineral oil and trisnonylphenyl phosphite were then introduced into the dissolving vessel and the mixture was agitated until the rubber and additives were completely dissolved. The dissolving vessel was alternately purged with nitrogen and evacuated under reduced pressure to remove dissolved air. The resulting solution was pumped through a filter to a prepolymerization vessel at about 20 p.s.i.g. to eliminate external contaminants and any undissolved polybutadiene granules. Nitrogen was then pressured into the prepolymerization vessel to increase the operating pressure to about 35 p.s.i.g. The prepolymerization vessel was similar to that described under the Preferred Embodiments Section in which a hot oil jacket was provided to heat the reactants to and to maintain the reactants at the prepolymerization temperature. Cooling coils were provided on the outer surface of the vapor section directly above the hot oil jacket. The solution was heated to about 90° C., t-dodecyl mercaptan chain transfer agent was added to the solution and the solution was then heated to 105° C. During this example water at 13° to 20° C. was passed through the cooling coil to maintain the inner surface of the vapor section well below the 105° C. prepolymerization temperature. After the solution was heated to 105° C., which took approximately 2 to 3 hours, the oil temperature in the outer jacket was reduced about 10° to 15° C. to maintain the prepolymerization solution at the required 105° C. The prepolymerization was continued with agitation until the vessel contained 26 weight percent total solids. The composition of the solution charged to the prepolymerization vessel was as follows:

| | Wt. percent |
|---|---|
| Styrene | 68.2 |
| Acrylonitrile | 22.75 |
| Polybutadiene | 8.0 |
| Mineral oil | 0.75 |
| Trisnonylphenyl phosphite | 0.25 |
| t-Dodecyl mercaptan | 0.05 |

An aqueous solution of 0.3 weight percent of hydroxyethyl cellulose was prepared prior to the suspension step and added to a suspension vessel. The prepolymer was then transferred to the suspension vessel at the prepolymerization temperature at a 1:1 ratio of prepolymer to the aqueous solution.

A visual inspection of the vapor section indicated no macrogel particles had formed on its inner surface after the prepolymer was transferred from the prepolymerization vessel.

To the suspension vessel was added 0.15% t-butyl perbenzoate based on the weight of the prepolymer. The suspension was heated to 105° C. and the polymerization was completed at the following temperature cycle:

| Hours: | ° C. |
|---|---|
| 2½ | 105 |
| 1 | 115 |
| 1 | 125 |
| 1½ | 145 |

It took a ½ hour to raise the temperature from each temperature plateau to another.

The reaction product in the suspension vessel was centrifuged, washed, dried and extruded into pellets. The pellets were then dried and extruded and passed through a series of rollers to produce a 0.001 inch sheet. The sheet was visually examined and found to be clear and free of visible macrogels. A sample of the 0.001 inch sheet was drawn to less than 10 mil size. A visual examination of the 10 mil sheet again indicated no evidence of macrogels.

CONTROL

The above example was repeated except that no cooling coils were provided on the outer surface of the vapor section. After the prepolymerization step, the inner surface of the vapor section was found to be covered to a depth of 3 to 6 inches with macrogel particles. The subsequent 0.001 inch sheet produced from the resulting ABS polymer was rough and covered with opaque bumps which showed that the macrogels had been carried through the process and into the final product.

Obviously, other modifications can be made to the process of this invention than those illustrated by this example without departing from the spirit of the invention. All such modifications that fall within the scope of the appended claims are intended to be embraced thereby.

What is claimed is:

1. In a process for preparing a rubber-modified polymer comprising the step of polymerizing a monomer selected from the group consisting of styrene, methylstyrenes, ethylstyrenes, isopropylstyrenes, butylstyrenes, chlorostyrene, dichlorostyrenes, monobromostyrenes, dibromostyrenes, acrylonitrile, methacrylonitrile, methylacrylate, methyl methacrylate, methacrylic acid, acrylic acid, vinyl chloride or mixtures thereof with a rubbery material from the group consisting of natural rubber, copolymers of styrene and butadiene having 60 to 95 percent by weight of butadiene and from 40 to 5 percent by weight of styrene, synthetic nitrile type rubbers containing from 55 to 82 percent by weight of butadiene and from 45 to 18 percent by weight of acrylonitrile, homopolymers of butadiene and of isoprene, rubbery copolymers of isobutylene combined with butadiene or isoprene and rubbery terpolymers of ethylene, propylene and a minor amount of a diene at an elevated temperature in a confined reaction zone containing a vapor section having an inner surface exposed to the reactants, the improvement in said process which comprises maintaining during the polymerization step a substantial portion of said inner surface at least 35° C. to about 50° C. cooler than said elevated temperature to prevent the formation of undesirable macrogel particles on said inner surface and recovering from said confined reaction zone a reaction product substantially free of said particles.

2. The process of claim 1 wherein said macrogel particles are greater than 35 microns at their largest dimension.

3. The process of claim 1 wherein styrene is the monomer in said confined reaction zone.

4. The process of claim 1 wherein styrene and acrylonitrile are the monomers in said confined reaction zone.

5. The process of claim 1 wherein said rubbery material is selected from a group consisting of homopolymers of butadiene and isoprene, copolymers of butadiene with styrene, and copolymers of butadiene with acrylonitrile.

6. The process of claim 1 wherein a diluent is present with the monomer and said rubbery material.

7. A process for preparing a rubber-modified vinyl aromatic-acrylonitrile polymer which comprises the steps of:

(1) bulk prepolymermizing with agitation a monomeric mixture comprising at least one monovinyl aromatic compound from the group consisting of styrene, methylstyrenes, ethylstyrenes, isopropylstyrenes, butylstyrenes, chlorostyrene, dichlorostyrenes, monobromostyrenes, dibromostyrenes, or mixtures thereof and acrylonitrile with a rubbery material from the group consisting of natural rubber, copolymers of styrene and butadiene having 60 to 95 percent by weight of butadiene and from 40 to 5 percent by weight of styrene, synthetic nitrile type rubbers containing from 55 to 82 percent by weight of butadiene and from 45 to 18 percent by weight of acrylonitrile, homopolymers of butadiene and of isoprene, rubbery copolymers of isobutylene combined with butadiene or isoprene and rubbery terpolymers of ethylene, propylene and a minor amount of a diene at an elevated temperature of about 60° to 120° C. and a total pressure of about 20 to 70 p.s.i.a. in a confined prepolymerization zone containing a vapor section having an inner surface exposed to said said rubbery material and vapors of said monomeric mixture in the presence of at least about 10% of an inert gas based on the weight of said vapors in said vapor section, wherein the prepolymerization step is carried out to a conversion of from about 10 to 50%, (2) maintaining during said prepolymerization step a substantial portion of said inner surface at least 35° C. to about 50° C. cooler than said elevated temperature to prevent the formation of undesirable macrogel particles on said inner surface, (3) suspending the resulting prepolymer from said confined prepolymerization zone in an aqueous system containing a suspension stabilizer in a suspension zone, (4) substantially completely polymerizing said prepolymer in the presence of a free-radical generating type initiator, and (5) recovering from said suspension zone a reaction product substantially free of said undesirable macrogel particles.

8. The process of claim 7 wherein said macrogel particles are greater than 35 microns at their largest dimension.

9. The process of claim 7 wherein styrene is said monovinyl aromatic compound.

10. The process of claim 7 wherein said acrylonitrile is present in said confined prepolymerization zone in amounts of up to about 40 weight percent.

11. The process of claim 7 wherein said rubbery material is a linear polybutadiene.

References Cited

UNITED STATES PATENTS

| 2,694,692 | 11/1954 | Amos et al. | 260—880 |
| 3,278,642 | 10/1966 | Lee | 260—880 |
| 3,337,650 | 8/1967 | Marcil | 260—880 |
| 3,461,109 | 8/1969 | Hinton et al. | 260—83.7 |

FOREIGN PATENTS

| 537,040 | 2/1957 | Canada | 260—880 |
| 702,146 | 1/1965 | Canada | 260—94.3 |

JAMES A. SEIDLECK, Primary Examiner

U.S. Cl. X.R.

260—4, 878, 879